Sept. 13, 1949.  C. E. HEMMINGER  2,481,841
METHOD OF PREPARING CATALYST PARTICLES HAVING
NUCLEI OF PREVIOUSLY CALCINED FINES
Filed Nov. 2, 1945  2 Sheets-Sheet 1
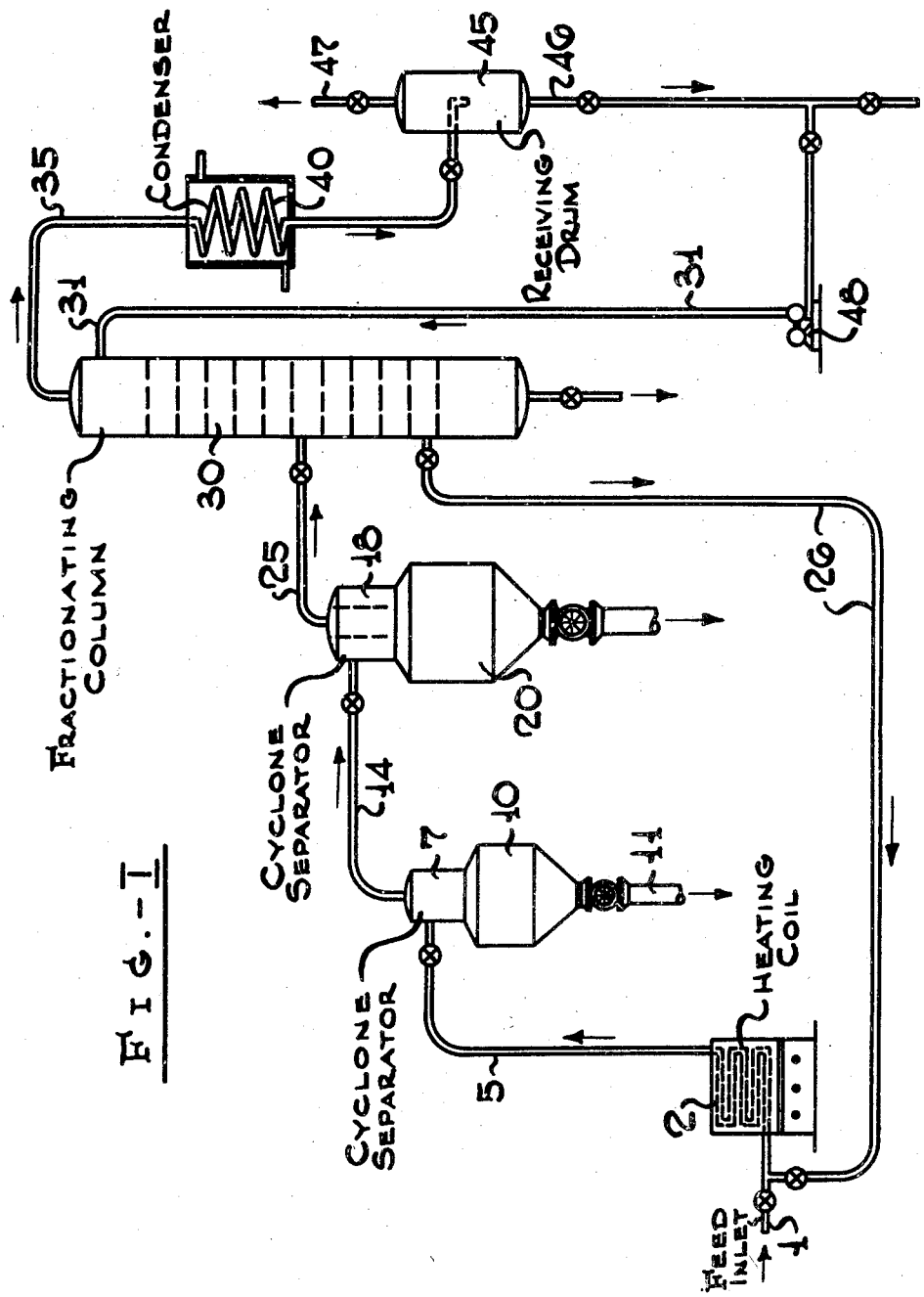
Charles E. Hemminger  Inventor
By P. J. Trhela  Attorney

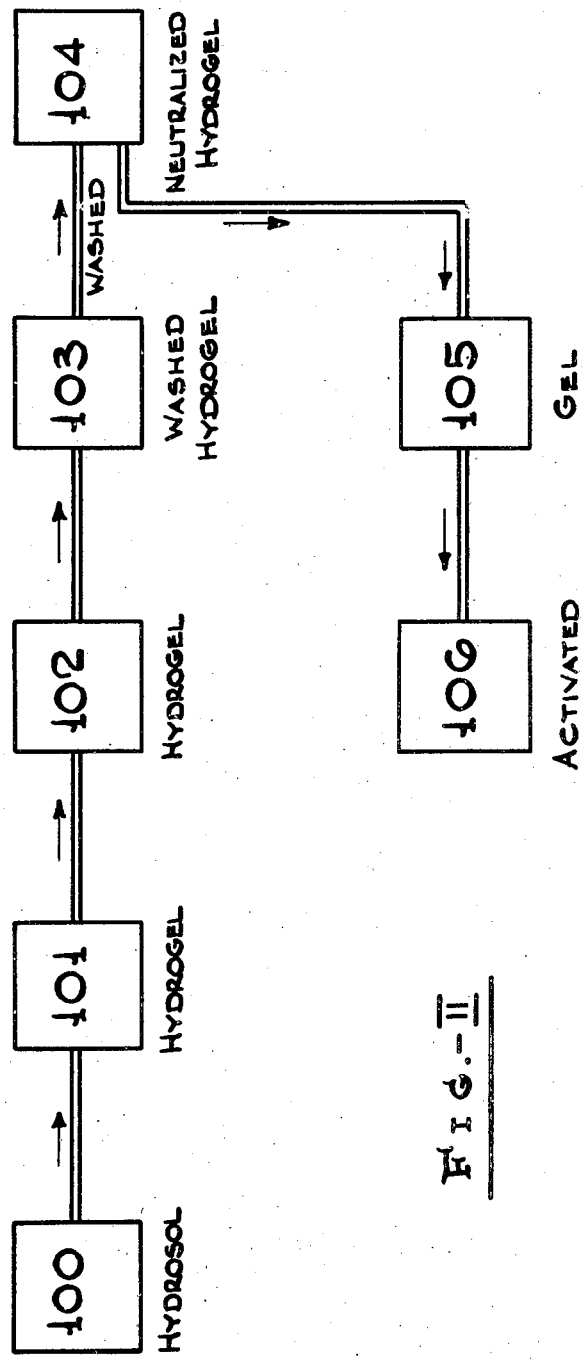
FIG.-II

Patented Sept. 13, 1949

2,481,841

UNITED STATES PATENT OFFICE 2,481,841

METHOD OF PREPARING CATALYST PARTICLES HAVING NUCLEI OF PREVIOUSLY CALCINED FINES

Charles E. Hemminger, Westfield, N. J., assignor to Standard Oil Development Company, a corporation of Delaware Application November 2, 1945, Serial No. 626,426

8 Claims. (Cl. 252—454)

The present invention relates to improvements in the art of catalysts and their preparation, and in particular it relates to catalysts and the preparation of catalysts for conversion processes in which a divided catalyst is passed through the conversion system.

In catalytic conversion processes, such as the catalytic cracking, hydrogenation, reforming or other catalytic refining of hydrocarbon oils, the catalytic synthesis of hydrocarbons from carbon monoxide and hydrogen, and other chemical conversions, there are two general types of operation. In the first type of operation the fluid reactants to be converted are forced through a stationary bed or beds of catalyst where the conversion takes place. In the second type of operation the reactants to be converted and the catalyst in divided form, such as in the form of pellets or powder, are passed continuously through the conversion zone. This may be done either by passing the catalyst in the form of a bed moving under its own weight downwardly through the conversion zone countercurrently or concurrently with the reactants or by injecting powdered catalyst into the vaporous or gaseous reactants to form a suspension of catalyst therein and discharging the suspension into a conversion zone. Either modification of the second type of operation usually comprises a reaction phase maintained at temperatures of about 800°–1000° F., a purging of the catalyst after separation from the reaction products, a regeneration phase after separation of the catalyst from the purging medium, maintained at a temperature of about 900°–1200° F., and a second purging phase after separation of the catalyst from the regenerating medium. In other words, the catalyst passes continuously through several phases of a cycle and reaction products are continuously recovered from the system.

Since the catalyst is continuously moving through the phases of the above cycle of operations, it can readily be appreciated that it is subjected to constant abrasion due to contacts with the inner surfaces of conduits, coils, and the like, and, in particular, the catalyst is subjected to rather severe frictional forces and collisions during the separation of catalyst from vapors, the separation usually being effected in cyclone separators. As a result of continual passage of the catalyst through the above cycle of operations, the catalyst normally undergoes physical deterioration and appreciable quantities of fines are formed. Generally speaking, the catalyst should have a fairly uniform particle size, ranging somewhere between the limits of 50–400 mesh and ½ inch diameter. If appreciable quantities of catalyst dust or fines are formed, it is virtually impossible to separate these fines from the vapors and, of course, the presence of catalyst in the desired reaction products is highly undesirable. From the standpoint of economy, the loss of catalyst through formation of non-removable fines represents an economic defect in the process.

An important object of my invention is to provide a catalyst which has an increased resistance to abrasion.

Another object of my invention is to provide a catalyst consisting of small particles having nuclei of increased mechanical strength.

Another object of my invention is to utilize physically disintegrated catalyst removed from an operation in which catalyst is employed at elevated temperatures by combining the removed catalyst with fresh or new catalyst at some convenient stage in the manufacture of the latter prior to its sizing and shaping so as to maintain the particle size of the catalyst within certain specified limits.

Another object of my invention is to provide a catalyst maintaining its particle size within certain specified limits in order to save mechanical loss of the catalyst because of unremovable fines before it is necessary to discard it because of permanent inactivity.

Another object of my invention is to provide a catalyst maintaining its particle size within certain specified limits in order to make mechanical operation of the catalytic process wherein it is used, more uniform, such as to be able to maintain substantially constant the flow of the suspension of fluids containing catalyst through valves, etc., and, in general, to cause the catalyst process to be more readily operated.

Another object of my invention is to provide a powdered catalyst which may be readily prevented from appearing in the desired reaction products.

Other and further objects of my invention will appear more fully and at large hereinafter.

I have found that these objects and advantages may be accomplished by providing a catalyst consisting of small particles having nuclei of the same material previously subjected to a high-temperature treatment, such as calcination, sintering or the like, preferably at temperatures above about 900° F. More particularly, I have found that improved catalysts of increased mechanical strength may be obtained when catalyst fines which have been subjected to the above-mentioned high temperatures of a catalytic conversion system are used to form the nuclei of the particles of freshly prepared catalyst. The removal of catalyst fines from the conversion system for this purpose may be made continuous and may thus contribute to the maintenance of a uniform particle size in the conversion system.

While my invention is applicable with equal advantage to catalysts used in high-temperature chemical conversion systems involving moving catalyst phases quite generally, it will be hereinafter described in more detail in connection with a catalyst for the catalytic conversion of hydrocarbon oils.

My invention will be best understood by reference to the accompanying drawing in which Fig. I represents diagrammatically a combination of apparatus elements in which a preferred modification of my improvements may be carried into practical effect, and Fig. II represents, by means of a flow plan, the various steps employed in the preparation of a synthetic catalyst and indicates the step at which the fines removed from the operation conducted in Fig. II may be added to the catalyst during this preparation.

Referring in detail to Fig. I, a hydrocarbon oil, such as a gas oil, is introduced into the system through line 1 and then introduced into a cracking coil or reactor represented generally by the reference character 2, where the desired cracking conversion takes place at conventional cracking temperatures of about 800°–1000° F. The reference character 2 indicates a portion of the process which includes any convenient method for suspending a powdered catalyst, according to known methods, in hydrocarbon oil vapors heated to reaction temperature and causing the heated hydrocarbon oils to flow through a reaction zone under suitable conditions to effect the desired conversion, whereupon the suspension of catalyst in reaction vapors is withdrawn through line 5 and discharged into a cyclone separator 7 where the major portion of the catalyst is removed from the reaction vapors and passes by gravity into a receiving vessel 10. The vapors are withdrawn from the separator 7 through conduit 14 and pass into a secondary cyclone separator 18 where another portion of catalyst is removed from the reaction vapors and passes by gravity into a second receiving vessel 20. The reaction vapors are withdrawn through line 25 from the second cyclone separator 18, and at this point they normally will not contain more than 0.5% of their original content of catalyst, and this catalyst content consists almost entirely of fines and dust which have not been removed in the cyclone separators and probably cannot be removed by any such mechanical method, or by electrical precipitation. These fines have been formed, as indicated, by the erosion, caused by friction forces, and collisions to which the catalyst has been subjected during its passage through the cracking, purging and regeneration steps. The amount of these fines leaving the secondary cyclone separator represents a loss of catalyst to the system and, furthermore, the presence of these fines in the finished products, is obviously objectionable. This loss depends on the amount of fines, say material having a particle size smaller than 400 mesh, in the recirculating system. This loss may be made negligible according to my process, by maintaining the catalyst size in the recirculating stream above some minimum, as hereinafter more fully set forth.

Referring again to the vapors in conduit 25, the same are discharged to a fractionating column 30 from which the desired products may be separated from the material to be recycled. The desired products, such as cracked gasoline, may be taken off overhead through line 35, passed through a condenser coil 40 and thence into receiver 45 from which gasoline may be recovered through pipe 46, while normally gaseous hydrocarbons are withdrawn through pipe 47. Referring back to fractionating tower 30, the same should be provided with a reflux line 31 through which the liquid product withdrawn from receiver 45 through line 46 may be forced by pump 48 into tower 30 to wash fines from the vapors leaving said tower. A gas oil stock may be recycled from tower 30 through conduit 26 to the cracking phase.

Referring to receptacle 10 containing removed catalyst, the said catalyst is withdrawn through valve conduit 11 suspended in a regeneration gas and conducted to a regeneration unit (not shown) operated at conventional regeneration temperatures of about 900°–1200° F. The amount of catalyst recovered in cyclone separator 7 represents about 95% to 99% of the total catalyst originally present in the vapors, and this catalyst normally would be of substantially uniform size and thereafter may be returned after regeneration and purging to the cracking operation. On the other hand, the catalyst recovered in vessel 20 is of much smaller size due to physical disintegration and classification in the reaction and regeneration circuit and cyclone separator 7, and at least a portion of this catalyst should be withdrawn from the system and treated in a manner hereinafter more fully described.

Referring to Fig. II, which indicates diagrammatically by a flow plan the steps involved in the preparation of a synthetic gel catalyst, such as silica gel, the operation is begun by forming a hydrosol in the step represented by reference character 100. This hydrogel is formed, as is known (see U. S. patent to W. A. Patrick, No. 1,297,724, granted March 18, 1919), by mixing appropriate amounts of water glass or sodium silicate of definite concentration of sodium and $SiO_2$ with a given amount of hydrochloric acid of given concentration and thereafter the mass is permitted to stand, whereupon a hydrogel is formed in the stage represented by 101. This hydrogel is in a form such that the solid represents the external phase, the water constituting the dispersed phase. In other words, the hydrogel is the reverse of the hydrosol in which, of course, solid material is dispersed in the water. Sodium chloride formed by the reaction with hydrochloric acid is removed by extensive washing with water. The gel in the hydrogel stage is then treated with aluminum sulfate and thereafter the impregnated gel represented by stage 102 is washed with ammonia represented by stage 103 and thereafter washed with water as represented by stage 104, then dried in step 105 and finally the dried gel is pulverized to the desired size and activated by slowly heating to about 850° F. in step 106.

The process just now outlined, as such, is not part of my invention, since the preparation and activation of the gel is per se well known. My invention includes admixing, e. g., in stage 100, with the silica gel in the hydrosol stage, from 5 to 15 parts by weight of catalyst recovered from the receptacle 20 in Fig. I, per 100 parts of the hydrogel, the catalyst being admixed with the hydrosol after regeneration of the catalyst. The addition of the catalyst to the gel in the hydrosol phase in nowise interferes with the formation of the finished activated gel.

As a further modification of my invention, which may be preferable in many cases, the catalyst recovered from the receptacle 20 or a corresponding phase in any other conversion system may be added after the hydrogel is formed, for instance by thoroughly mulling the catalyst fines with the hydrogel formed in phases 101 and 102 or otherwise incorporating the solids fines into the wet gel by mixing and/or grinding, etc. This step may be combined in numerous cases with a mulling or grinding step required for the conventional preparation of fresh catalyst, for example where metals or metal compounds, such as cobalt or magnesium oxide, are mixed with a hydrogel of silicon oxide after its formation but prior to the final drying step.

In the case where the catalyst is an acid-treated clay, the catalyst recovered from vessel 20 may be mixed with fresh acid-treated clay, ground, admixed with water and extruded to form particles of the desired strength. In the case of catalyst requiring sintering prior to use, such as iron catalysts for the hydrocarbon synthesis from carbon monoxide and $H_2$, the originally sintered catalyst fines recovered from the process may be mixed with new material prior to its sintering.

It will be understood that the dimensions hereinbefore set forth as to particle size are purely illustrative and obviously my invention is applicable to the preparation of a catalyst of any given size. The main feature of my invention as heretofore outlined is to provide a catalyst maintaining in a catalytic operation, operated continuously, a size fixed within some limits, such as 50–400 mesh, and as a corollary to this feature, my invention includes the preparation of new or fresh catalyst to include used catalyst which has undergone physical deterioration in a catalytic operation.

In the modification hereinbefore set forth, two cyclone separators were employed to remove the catalyst from the reaction vapors. It will be understood that my process is not limited to the use of merely two cyclone separators, for I may use three or more cyclone separators and these may be followed by Cottrell precipitators. In the case where more than two cyclone separators are employed, I normally remove the catalyst material from the catalytic process from the last separator and incorporate it into fresh catalyst undergoing preparation. However, I do not wish to be limited to removal of the catalyst from the last separator but wish to include as part of my invention removal of all catalyst material having a particle size smaller than about 400 mesh, and to incorporate this material with catalyst undergoing preparation.

It will be understood, of course, that instead of removing catalyst from the system following the conversion step, the same may be removed following the regeneration of the fouled catalyst.

In the modification of my invention illustrated by the drawing the catalyst fines of increased strength to be incorporated into fresh catalyst are derived from a previous catalytic conversion. However, my invention is not limited to the incorporation of catalyst fines so derived, for I may use for this purpose fine catalyst particles previously subjected to any other thermal treatment increasing their physical strength, such as calcining, sintering, and the like, preferably at temperatures above 900° F. Also, other synthetic gels, such as alumina gel, chromia gel or mixed gels may be used.

Many other modifications of my invention may be made by those who are familiar with this art.

This application is a continuation-in-part of my copending application, Serial No. 354,922, filed August 31, 1940, now abandoned.

What I claim is:

1. The method of preparing a catalyst for catalytic high temperature conversions in which a sub-divided catalyst is suspended in vapors during the catalytic treatment which comprises incorporating into fresh catalyst undergoing preparation prior to its sizing and shaping to the desired particle size, catalyst withdrawn from a catalytic cracking operation including a high temperature catalyst regeneration step, said withdrawn catalyst having a particle size substantially smaller than said desired size.

2. The method as claimed in claim 1 in which said catalytic cracking of hydrocarbon involves temperatures above about 900° F. and said desired size falls within the approximate range of from 50 to 400 mesh.

3. The method of preparing the synthetic gel type catalyst of desired substantially uniform particle size for catalytic high temperature cracking operations in which a subdivided catalyst is suspended in vapors during the catalytic process which comprises mixing the synthetic gel type catalyst undergoing preparation prior to drying with fines of the same synthetic gel type catalyst withdrawn from said high temperature catalytic cracking operation in the ratio of 5 to 15 parts by weight of said withdrawn catalyst to 100 parts by weight of said synthetic gel type catalyst undergoing preparation, said withdrawn catalyst having a particle size substantially smaller than said desired size.

4. The method as claimed in claim 3 in which said mixing takes place when the catalyst undergoing preparation is in the hydrosol stage.

5. The method as claimed in claim 4 in which said catalyst fines are mixed with the catalyst undergoing preparation prior to the drying of the latter.

6. The method as claimed in claim 5 in which said gel type catalyst is a synthetic silica gel type catalyst.

7. The method of preparing a catalyst for use in the catalytic treatment of petroleum oils wherein a catalyst is suspended in the vapors during the catalytic treatment which comprises withdrawing catalyst, having a particle size smaller than 400 mesh, from said catalytic treatment, and incorporating it into fresh catalyst undergoing preparation prior to the sizing of the fresh catalyst.

8. The method of preparing a catalyst for use in the catalytic treatment of petroleum oil wherein an impregnated silica gel catalyst, having a particle size of from about 200–400 mesh is suspended in the vaporized oil during the catalytic treatment, which comprises withdrawing impregnated silica gel catalyst having a particle size smaller than 400 mesh from said catalytic treatment, mixing the withdrawn used impregnated silica gel catalyst with impregnated silica gel catalyst undergoing preparation during the hydrosol stage and completing the preparation of the catalyst undergoing preparation in the presence of the used impregnated silica gel catalyst.

CHARLES E. HEMMINGER.

REFERENCES CITED

The following references are of record in the file of this patent:

UNITED STATES PATENTS

| Number | Name | Date |
|---|---|---|
| 1,540,445 | Wilson | June 2, 1925 |
| 1,672,768 | Miller et al. | June 5, 1928 |
| 2,146,718 | Bond | Feb. 14, 1939 |
| 2,337,684 | Scheineman | Dec. 28, 1943 |
| 2,410,284 | Gunness et al. | Oct. 29, 1946 |